Nov. 7, 1933.   C. B. LESTER   1,934,436
ICE CREAM CONE CARRIER AND PROTECTOR
Filed July 9, 1931
FIG. 4.   FIG. 1.
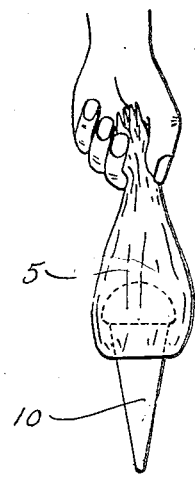
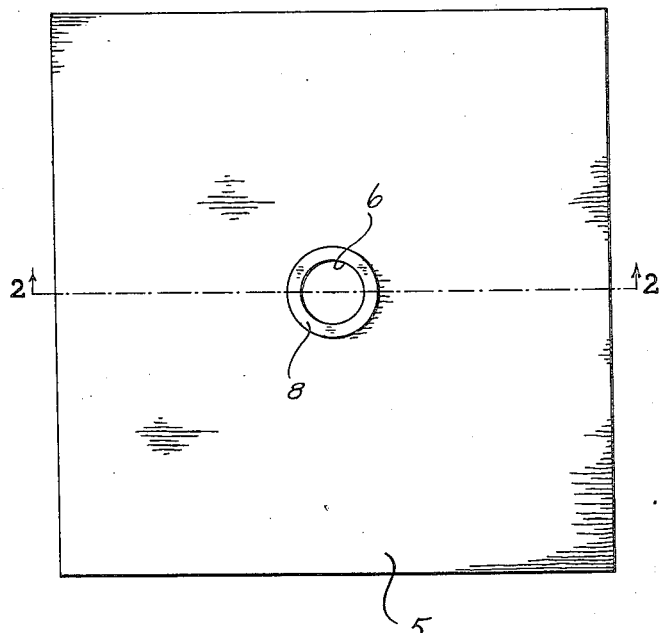
FIG. 2.
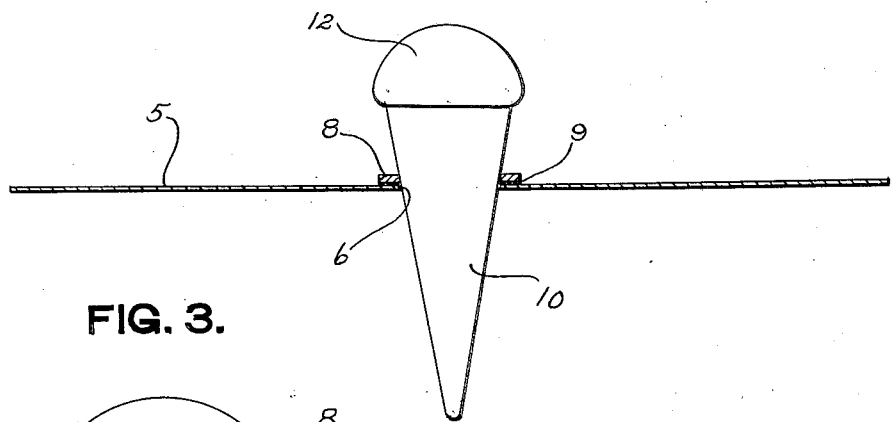
FIG. 3.
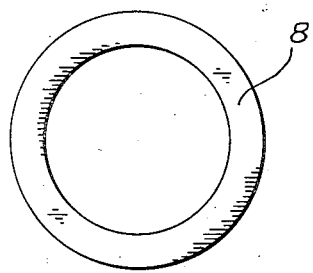
INVENTOR.
Ciss B. Lester
BY *Lancaster, Allwine and Rommel*
ATTORNEYS.

Patented Nov. 7, 1933

1,934,436

UNITED STATES PATENT OFFICE 1,934,436

ICE CREAM CONE CARRIER AND PROTECTOR

Ciss Birnie Lester, Laramie, Wyo.

Application July 9, 1931. Serial No. 549,833

2 Claims. (Cl. 229—87)

The present invention relates to handling devices for ice cream cones, and the primary object of the invention is to provide a combined carrier and protector for ice cream cones whereby the ice cream cone may be easily carried and handled without spilling the ice cream placed in the upper end of the edible cone-shaped container.

A further object of the invention is to provide an ice cream cone carrier which will facilitate the carrying of a number of ice cream cones in an upright position.

A further object of the invention is to provide an ice cream cone carrier and protector wherein the ice cream will be so covered as to prevent the settling of dust upon the ice cream and preventing melting of the ice cream.

A still further object of the invention is to provide a device of this character which will be extremely simple and inexpensive to manufacture.

A further object of the invention is to provide an ice cream cone carrier and protector wherein the cone-shaped container is pendently received through the center portion of a body of material adapted to be gathered together over the ice cream to provide a carrying portion covering the ice cream.

Other objects and advantages of the invention will be apparent during the course of the following detailed description, taken in connection with the accompanying drawing forming a part of this specification and in which drawing:—

Figure 1 is a top plan view of the carrier in its flat condition prior to use.

Figure 2 is an enlarged transverse section on the line 2—2 of Figure 1 and showing an ice cream cone positioned in the carrier.

Figure 3 is a plan view of the reinforcing washer or ring forming a supporting base for the cone to rest in.

Figure 4 is a view showing the device in use and held in a person's hand for carrying or handling purposes.

Referring to the drawing in detail, and wherein similar reference characters designate corresponding parts throughout the several views, the numeral 5 designates a combined carrier and protector sheet which is preferably square-shaped as shown and may be formed of paper of a nature similar to that from which paper napkins are formed. The body of sheet material 5 may be of any suitable dimensions and is preferably of a soft, readily flexible nature. Formed axially through the sheet 5 is a circular opening 6 of a diameter slightly less than the diameter of the base of the cone-shaped container adapted to extend therethrough.

A reinforcing washer or ring 8 formed of a heavier grade of paper than that from which the sheet 5 is formed, is secured about the periphery of the opening 6 preferably by a suitable adhesive shown at 9. This reinforcing ring 8 has an internal diameter equal to that of the opening 6 through the sheet 5 and forms a seating ring with which the cone-shaped container 10 abuts adjacent its upper end. Thus the reinforcing ring 8 aside from preventing tearing of the preferably thin sheet 5 at the opening 6, provides a seat for the cone 10 when passed thru the carrier. This flat ring 8 is substantially rigid to prevent bending of the ring due to the weight of the ice cream cone, and causes the material of the sheet 5 to bulge outwardly from the frozen confection 12 when the sheet is gathered over the confection as shown in Figure 4.

In use, the frozen confection such as ice cream or the like as designated at 12 is placed in the upper open end of the hollow cone-shaped container 10 providing what is generally known as an ice cream cone. The ice cream cone is then inserted thru the reinforced center opening of the carrier sheet until the cone engages the ring 8. The corners of the sheet 5 are then drawn upwardly and gathered together over the ice cream forming an enclosure about the ice cream and providing a hand grip axially above the cone. When the sheet 5 is so gathered over the cone, one or more of the cones may be easily carried by bunching the gathered portions of the carrier sheet. While eating the cone, the napkin-like carrier may either be removed from the ice cream cone or if so desired the flexible sheet portion 5 may be doubled about the lower portion of the cone to form a wrapper while eating the cone. The size of the sheet 5 is sufficient to permit gathering of its corner portions into a hand hold above the ice cream 12. It is to be understood that the sheet 5 may be of any preferred shape and need not necessarily be perfectly square as shown.

From the foregoing it will readily be apparent that a simple and novel device of this character has been provided whereby one or more ice cream cones may be easily carried from place to place and with the ice cream in a protected enclosure. It will further be apparent that a device of this character may be cheaply and easily manufactured so that the additional cost of applying the device to ice cream cones for easy and sanitary handling thereof will be extremely low when compared with the advantages obtained thru use thereof.

Changes in details may be made to the form of invention herein shown and described, without departing from the spirit of the invention or the scope of the following claims.

I claim:

1. An ice cream cone carrier comprising a square-shaped paper napkin sheet having an axially disposed circular cone receiving opening, and a flat reinforcing ring secured by adhesive to one face of the sheet co-axially of the opening in the sheet, said ring having an internal diameter equal to the diameter of said opening and forming a rest for a cone inserted therethrough.

2. A device for use with ice cream cones, comprising a paper napkin body sheet having an axially disposed circular opening, and a combined stiffening and reinforcing ring of a flat sheet material heavier than that of said body sheet, secured to the body sheet axially about the opening, said ring having an opening therethrough slightly less than the base diameter of the cone to be received therein.

CISS BIRNIE LESTER.